July 5, 1966     H. ALLEN, JR., ET AL     3,258,912
METHOD OF IGNITING SOLID PROPELLANTS
Original Filed March 16, 1962     2 Sheets-Sheet 1

INVENTORS
HARRISON ALLEN JR.
CARL C. CIEPLUCH
EDWARD A. FLETCHER

BY

ATTORNEYS

July 5, 1966  H. ALLEN, JR., ET AL  3,258,912
METHOD OF IGNITING SOLID PROPELLANTS
Original Filed March 16, 1962  2 Sheets-Sheet 2

INVENTORS
HARRISON ALLEN JR.
CARL C. CIEPLUCH
EDWARD A. FLETCHER

BY

ATTORNEYS

United States Patent Office 3,258,912
Patented July 5, 1966

3,258,912
METHOD OF IGNITING SOLID PROPELLANTS
Harrison Allen, Jr., Cleveland, and Carl C. Ciepluch, Berea, Ohio, and Edward A. Fletcher, Minneapolis, Minn., assignors to the United States of America as represented by the Administrator of the National Aeronautics and Space Administration
Original application Mar. 16, 1962, Ser. No. 180,370, now Patent No. 3,173,251, dated Mar. 16, 1965. Divided and this application Sept. 13, 1963, Ser. No. 308,918
3 Claims. (Cl. 60—35.6)

The invention described herein may be manufactured and used by or for the Government of the United States of America for governmental purposes without the payment of any royalties thereon or therefor.

This invention pertains to the ignition of solid propellant rocket motors, and more particularly, to the ignition of solid propellant rocket motors by the injection of hypergolic fluids.

This application is a division of copending application Serial No. 180,370 which was filed on March 16, 1962 and issued on March 16, 1965, as U.S. Patent No. 3,173,251.

Solid propellant rockets are customarily ignited by firing a small quantity of pyrotechnic powder, such as black powder, in the form of a squib. Igniters of this type have many disadvantages, such as great temperature sensitivity which requires certain environmental conditions, unpredictable shelf life which results in deterioration, complicated mechanical parts which may not be reliable, and rigid quality control requirements.

In order to solve these problems, it has been proposed to distribute a chemical fluid such as bromine trifluoride or chlorine trifluoride over a large area of a mass of solid propellant. The fluid reacts hypergolically with either the fuel or oxygen component of the propellant grains to cause ignition. However, this ignition is not simultaneously and an objectionable delay results which makes firing at a precise time difficult to obtain.

It is, therefore, an object of the invention to provide an improved method of igniting a mass of solid propellants using a hypergolic igniting fluid.

Another object of the invention is to provide a method of igniting a mass of solid propellant utilizing hypergolic fluids wherein the igniting substance is concentrated on predetermined portions of the propellant.

Other objects of the invention will be apparent from the following description when taken together with the accompanying drawings wherein like numerals are used throughout to identify like parts.

In order to achieve the above listed objects there is provided a method of igniting a tubular mass of solid propellant in which a measured quantity of hypergolic fluid is injected into an opening in the tubular mass. This hypergolic fluid is directed against predetermined portions of the walls of the opening.

Figure 1:
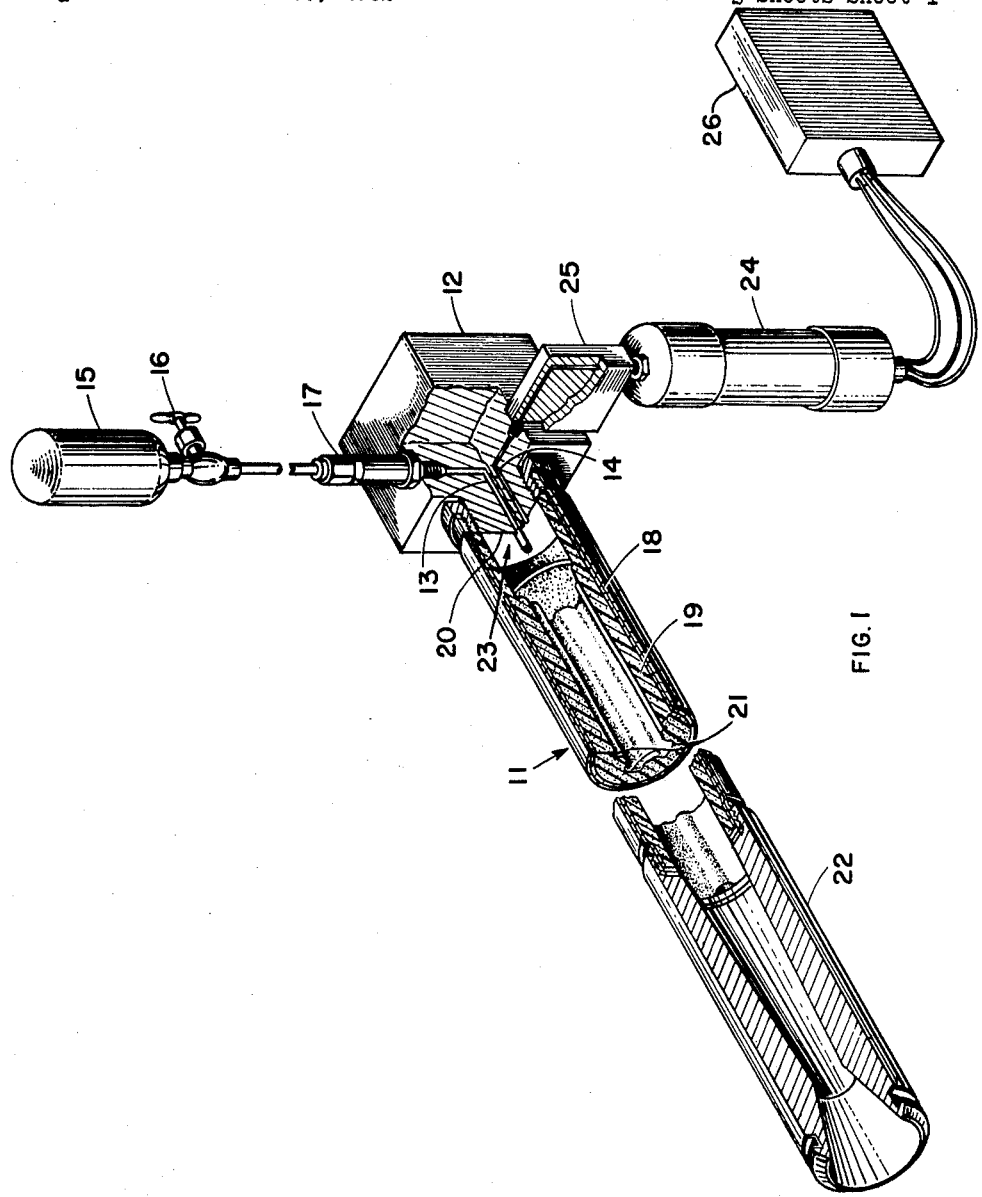
FIG. 1 is a partially sectioned, perspective view of a composite propellant motor having improved ignition apparatus for performing the method of the invention.

Referring to the drawings, there is shown in FIG. 1 a testing apparatus for determining the effects of different ignition fluids and various injector configurations, together with other features relating to the ignition of a rocket engine. This testing apparatus comprises a solid propellant motor 11 having a head 12 such as a block of steel or other similar material located at its upstream end. A tap 13 for conveying an ignition fluid and a chamber pressure passage 14 are drilled in the block 12. The testing apparatus utilizes an ignition system which includes a storage bottle 15 connected to a control valve 16 that may be operated remotely by a powered mechanical device (not shown). The bottle 15 is previously filled with a measured quantity of ignition fluid and pressurized with a nonreactive gas such as helium. Additionally, the ignition system has a check valve 17 between the control valve 16 and the tap 13.

A double-walled cylindrical chamber 18 encloses a hollow charge consisting of a mass of solid propellant in the form of an elongated tube 19. The solid propellant in the tube 19 is preferably a composite consisting primarily of polysulfide polymer fuel and ammonium perchlorate oxidizer. The chamber 18 is rigidly attached to a protuberance in the form of a threaded boss 20 extending from a surface of the head 12. An opening comprising a bore having a plurality of longitudinal grooves 21 formed in the wall thereof extends along the entire axial length of the tube 19 from a nozzle 22 to the boss 20. The nozzle 22 is of the conventional convergent-divergent type and is rigidly affixed to the downstream end of the cylindrical casing 18 for conducting gases exhausted from the rocket engine 10.

According to the invention, hypergolic ignition fluid, such as chlorine trifluoride, bromine trifluoride, or bromine pentafluoride stored in the bottle 15 in a measured quantity such as five cubic centimeters, passes through the valves 16 and 17 into the tap 13. This measured quantity of fluid is then introduced into the head end of the opening in the propellant charge 19 by a suitable injector apparatus 23 associated with the boss 20 where the fluid is directed against preselected portions of the inside walls of the opening.

A pressure transducer 24 is positioned adjacent the head 12 by an intermediate block 25 through which the passage 14 in the head 12 also passes. The transducer 24 is connected to the passage 14 for measuring the chamber pressure, and this device can be of the strain gage type. The pressure side of the transducer 24 and vertical pressure line above it are filled with a high temperature silicone oil for protection from combustion gases. An electrical signal from the pressure transducer 24 is recorded on a direct recording oscillograph 26 which also measures ignition delay. This is accomplished by imposing a separate signal on the oscillograph record at the moment when the valve 16 is opened thereby marking time zero. The ignition delay is the elapsed time from the marked time zero until the chamber pressure rises to 50 percent of its normal value. This ignition delay comprises both dead time and reaction time; the dead time being the time required for the fluid to reach the injector after the opening of the valve 16 while the reaction time is determined by subtracting the dead time from the ignition delay. The dead time which is determined by high-speed photography is a constant of about 1.1 seconds for the disclosed testing apparatus.

Figure 2:
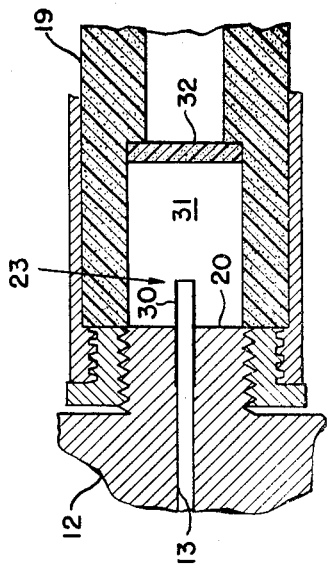
FIG. 2 is an enlarged sectional view of the preferred embodiment of a hypergolic fluid injector constructed in accordance with the invention.

The preferred form of an injector for performing the method of the invention is illustrated by the pocket type injector 23 in FIGS. 1 and 2. This injector comprises an elongated member such as a tube 30 that extends into the bore formed in the mass of solid propellant 19. A longitudinally extending passage in the tube 30 is in communication with the tap 13 for conveying hypergolic fluid into an enlarged pocket 31 formed in the end of the charge of solid propellant 19. A mass of solid propellant such as a disk 32 of plasticized polyvinyl chloride and ammonium perchlorate is positioned adjacent the tube 30 at the bottom of the pocket 31. The fluid is concentrated in the pocket 31 to react with both the solid propellant of the tube 19 and the disk 32 before it escapes through the nozzle 22 after the disk 32 burns.

The pocket type injector 23 was mounted in the apparatus shown in FIG. 1, and two tests were performed using 5 cubic centimeters of chlorine trifluoride pressurized with 15 p.s.i.g. helium gas. The tube 30 had an inside diameter of 0.104 inch and extended into a one inch diameter pocket 31 for a distance of ⅜-inch. The disk 32 was positioned 1½ inches from the head end of the charge 19, and the two tests produced reaction times of 0.31 and 0.34 second.

Figure 3:
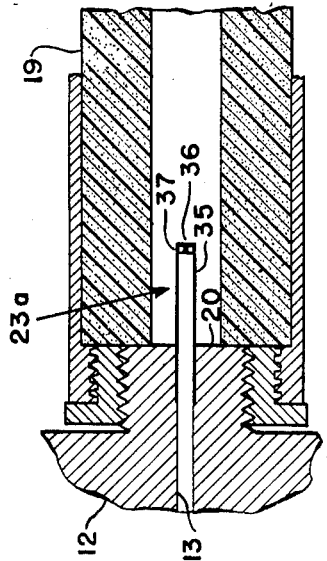
FIG. 3 is an enlarged sectional view of an alternate embodiment of the injector.

Referring to the embodiment of the invention shown in FIG. 3, the injector means 23a comprises a longitudinally extending tube 35 having its innermost end 36 closed. A plurality of radial apertures 37 extend through the walls of the tube 35 to concentrate the hypergolic fluid on the walls of the solid propellant charge 19.

A radial injector of the type shown in FIG. 3 comprising a tube 35 having an inside diameter of 0.104 inch was tested in the apparatus shown in FIG. 1. This tube 35 extended into the bore for a distance of ¾-inch and four radially-drilled holes 37, each having a diameter of 0.06 inch were provided for directing the fluid against the solid propellant. Hypergolic fluid in the storage bottle 15 was pressurized to 15 p.s.i.g. and reaction times of 0.55 and 0.59 second were observed.

Figure 4:
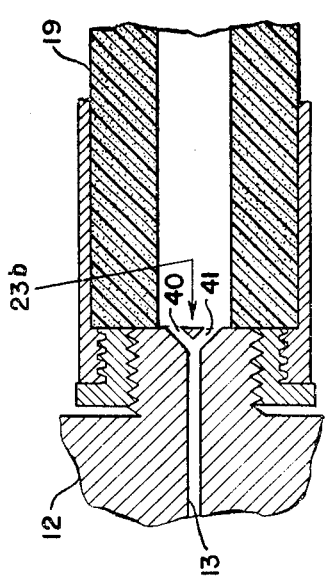
FIG. 4 is an enlarged sectional view of another embodiment of the injector.

Referring now to the Y type injector means 23b shown in FIG. 4, hypergolic fluid is conveyed to the head end of the tube 19 of solid propellant through the tap 13 as previously described. Passages 40 and 41 are drilled in the boss 20 to the tap 13 forming jets to concentrate the hypergolic fluid at the head end of the tube 19.

A Y type injector shown in FIG. 4 was tested in the apparatus shown in FIG. 1. This injector included a pair of drilled passages each having a diameter of 0.072 inch that were located at an angle of 90 degrees from one another. A spacing of 0.313 inch was provided between the ends of the passages 40 and 41, and a reaction time of 0.71 second was observed when the hypergolic fluid in the bottle 15 was pressurized to 15 p.s.i.g.

Figure 5:
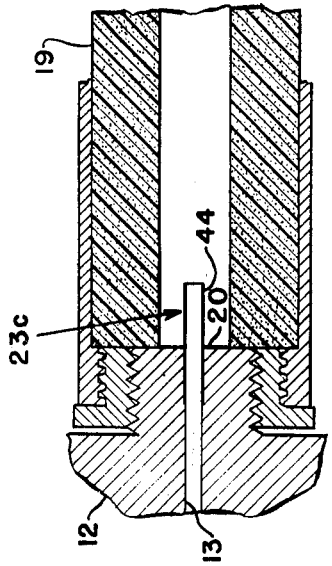
FIG. 5 is an enlarged sectional view of still another embodiment of the injector.

The axial type injector 23c shown in FIG. 5 consists of an elongated tube 44 coaxial with the bore in the tube 19 of solid propellant. Such a tube 44 having an inside diameter of 0.104 inch was mounted on the apparatus shown in FIG. 1 to extend into the bore in the solid propellant charge 19, a distance of ½-inch. A reaction time of 0.91 second was observed when the hypergolic fluid was pressurized to 15 p.s.i.g.

While the data in the above examples was obtained using a measured quantity of 5 cubic centimeters of ignition fluid, a composite propellant motor was also ignited with 2.5 and 10 cubic centimeters of chlorine trifluoride. The ignition characteristics observed were approximately the same for all these fluid quantities.

Several illustrative embodiments of the invention have been disclosed and various modifications may be made without departing from the spirit of the invention or the scope of the subjoined claims. For example, the invention is not limited to any particular type of solid propellant, and the various types of injectors that have been disclosed as being used with composite solid propellants are equally applicable to double-base propellant motors. Also, the hypergolic fluids are not limited to the three particular aforementioned fluorides.

What is claimed is:

1. A method of igniting a charge of solid propellant having a passage extending therethrough comprising the steps of
    blocking the passage prior to ignition,
    injecting a hypergolic fluid into the blocked passage thereby concentrating the fluid on a predetermined portion of the propellant charge, and
    unblocking the passage subsequent to the ignition of said predetermined portion of the solid propellant charge.

2. A method of igniting a rocket motor with a solid propellant charge of the type having a bore extending from a closed head end of the motor to a nozzle comprising the steps of
    placing an obstruction in the bore adjacent the head end of the motor,
    injecting a hypergolic fluid into the bore between the closed head end of the motor and said obstruction to concentrate the hypergolic fluid in the bore remote from the nozzle, and
    removing said obstruction subsequent to the ignition of the charge about the bore between the head end and the obstruction.

3. A method of igniting a rocket motor with a solid propellant charge of the type having a bore extending from a closed head end of the motor to a nozzle comprising the steps of
    positioning a mass of solid propellant in the bore thereby blocking a portion of the passage, and
    injecting a hypergolic fluid into said blocked portion whereby the solid propellant adjacent the bore is ignited and the mass of solid propellant is burned thereby enabling heat to be transferred to the remainder of the interior surface of the solid propellant charge by combustion gases during passage through the bore to the nozzle.

References Cited by the Examiner

UNITED STATES PATENTS

| | | | |
|---|---|---|---|
| 2,974,484 | 3/1961 | Cooley | 60—39.82 X |
| 2,990,682 | 7/1961 | Mullaney | 60—35.6 |
| 2,996,880 | 8/1961 | Greiner | 60—35.6 |
| 3,093,960 | 6/1963 | Tyson | 60—35.6 X |
| 3,136,119 | 6/1964 | Avery | 60—35.6 X |
| 3,144,751 | 8/1964 | Blackman et al. | 60—35.6 |
| 3,177,657 | 4/1965 | Strauss et al. | 60—35.6 |

MARK NEWMAN, *Primary Examiner.*

CARLTON R. CROYLE, *Examiner.*